UNITED STATES PATENT OFFICE.

ROBERT E. SCHMIDT, OF ELBERFELD, GERMANY, ASSIGNOR TO FARBENFABRIKEN OF ELBERFELD CO., OF NEW YORK, N. Y., A CORPORATION OF NEW YORK.

GREEN ANTHRACENE DYE.

No. 826,750.      Specification of Letters Patent.      Patented July 24, 1906.

Application filed December 23, 1905. Serial No. 293,111.

*To all whom it may concern:*

Be it known that I, ROBERT E. SCHMIDT, doctor of philosophy, chemist, (assignor to the FARBENFABRIKEN OF ELBERFELD CO., of New York,) residing at 22 Varresbeckerstrasse, Elberfeld, Germany, have invented a new and useful Improvement in Green Anthracene Dye; and I hereby declare the following to be a clear and exact description of my invention.

Alkaline sulfids produce, as is known, when acting on dinitroanthrarufin disulfonic acid in alkaline solution the diamidoanthrarufin disulfonic acid—a blue coloring-matter. I have now found that the reaction proceeds in a different way if it is carried out in neutral or acid solution. A new coloring-matter is thus obtained which dyes unmordanted wool pure green shades.

The new dyestuff is after being dried and pulverized in the shape of its sodium salt a dark-green powder which is soluble in hot acidulated water with a green color, very difficultly soluble in dilute caustic soda, and soluble in concentrated sulfuric acid with a yellowish-red color, which turns bluish-red by the addition of boric acid.

In order to produce the new dyestuff, I can proceed as follows, the parts being by weight: Ten (10) parts of the acid sodium salt of dinitroanthrarufin disulfonic acid are dissolved in seven hundred (700) parts of hot water with the addition of ten (10) parts of a solution of acetic acid containing fifty per cent (50 %.) A solution of twenty-five (25) parts of crystallized sodium sulfid in a hundred (100) parts of water is then gradually poured into the mixture through a tube reaching to the bottom of the flask, care being taken that the liquid is stirred at seventy-five degrees (75°) centigrade. During the first step of the operation, while the liquid is acid, an intermediate compound forms, the liquid assuming a violet-red color. When the free acid is saturated, the said intermediate compound is converted into the green dyestuff by the action of sodium sulfid in excess. By heating to ninety to ninety-five (90°–95°) degrees centigrade the color turns greenish blue, the dyestuff separating in small green needles, which are filtered off and washed with a small quantity of cold water.

The sodium sulfid can be replaced by other sulfids, hydrosulfids, or hyposulfites of alkalies, and the acetic acid may be replaced by formic acid, oxalic acid, benzoic acid, &c., or by mineral acids. The reaction can also be carried out in a neutral solution. In the latter case the green dyestuff is obtained in admixture with diamidoanthrarufin disulfonic acid, from which it can be separated by treatment with dilute caustic soda, which dissolves the diamidoanthrarufin disulfonic acid.

Having now described my invention and in what manner the same is to be performed, what I claim as new, and desire to secure by Letters Patent, is—

The herein-described new green dyestuff, obtainable by treating dinitroanthrarufin disulfonic acid with alkaline sulfids in neutral solution, which dyestuff is, when dry and pulverized, in the shape of its sodium salt a dark-green powder soluble in hot acidulated water with a green color, soluble with great difficulty in dilute caustic soda and being soluble in concentrated sulfuric acid with a yellowish-red color which turns bluish red by the addition of boric acid, substantially as described.

In testimony whereof I have signed my name in the presence of two subscribing witnesses.

ROBERT E. SCHMIDT.

Witnesses:
     OTTO KÖNIG,
     H. SCHMIDT.